(12) United States Patent
Hung

(10) Patent No.: US 6,926,450 B2
(45) Date of Patent: Aug. 9, 2005

(54) OPTICAL CONNECTOR

(76) Inventor: Chen-Hung Hung, No. 26, Lane 88, Fu-Shing Rd., Chung-Le Tsun, Ming-Shiung Hsiang, Chia-Yi Hsien (TW)

( * ) Notice: Subject to any disclaimer, the term of this patent is extended or adjusted under 35 U.S.C. 154(b) by 13 days.

(21) Appl. No.: 10/619,467

(22) Filed: Jul. 16, 2003

(65) Prior Publication Data

US 2005/0013551 A1 Jan. 20, 2005

(51) Int. Cl.[7] ............................................. G02B 6/36
(52) U.S. Cl. ........................ 385/84; 385/76; 385/77; 385/88; 385/92; 385/139
(58) Field of Search ........................ 385/53, 88, 89, 385/92, 93, 94, 139, 66, 76, 77, 84

(56) References Cited

U.S. PATENT DOCUMENTS

| | | | |
|---|---|---|---|
| 5,815,623 A | * | 9/1998 | Gilliland et al. ............... 385/93 |
| 6,071,017 A | * | 6/2000 | Gilliland et al. ............... 385/93 |
| 6,283,644 B1 | * | 9/2001 | Gilliland et al. ............... 385/93 |
| 6,550,983 B1 | * | 4/2003 | Gilliland et al. ............... 385/93 |
| 6,712,527 B1 | * | 3/2004 | Chan et al. ................... 385/88 |
| 2002/0168153 A1 | * | 11/2002 | Yamabayashi et al. ....... 385/88 |
| 2005/0013551 A1 | * | 1/2005 | Hung ........................... 385/88 |

* cited by examiner

*Primary Examiner*—Brian M. Healy
(74) *Attorney, Agent, or Firm*—Troxell Law Office, PLLC

(57) ABSTRACT

An optical connector including a hollow, cylindrical shroud having a section, a bore defined within the section, the bore being adapted to fit an optical fiber connector therein and allow the same to plug or unplug a predetermined number of times, the bore being terminated at a bottom opening of the section; a cylinder axially extended a predetermined distance from a center of the bottom of the section, the cylinder having a longitudinal hole with an optical fiber fitted therein wherein a precise circularity in each of the bore and the hole and coaxial characteristics of the same are obtained by forming the shroud and the cylinder by electrical casting; and an annular flange formed integrally in a bottom of the shroud by electrical casting or injection molding, the flange being adapted to fasten a laser diode element or light detection element.

4 Claims, 4 Drawing Sheets

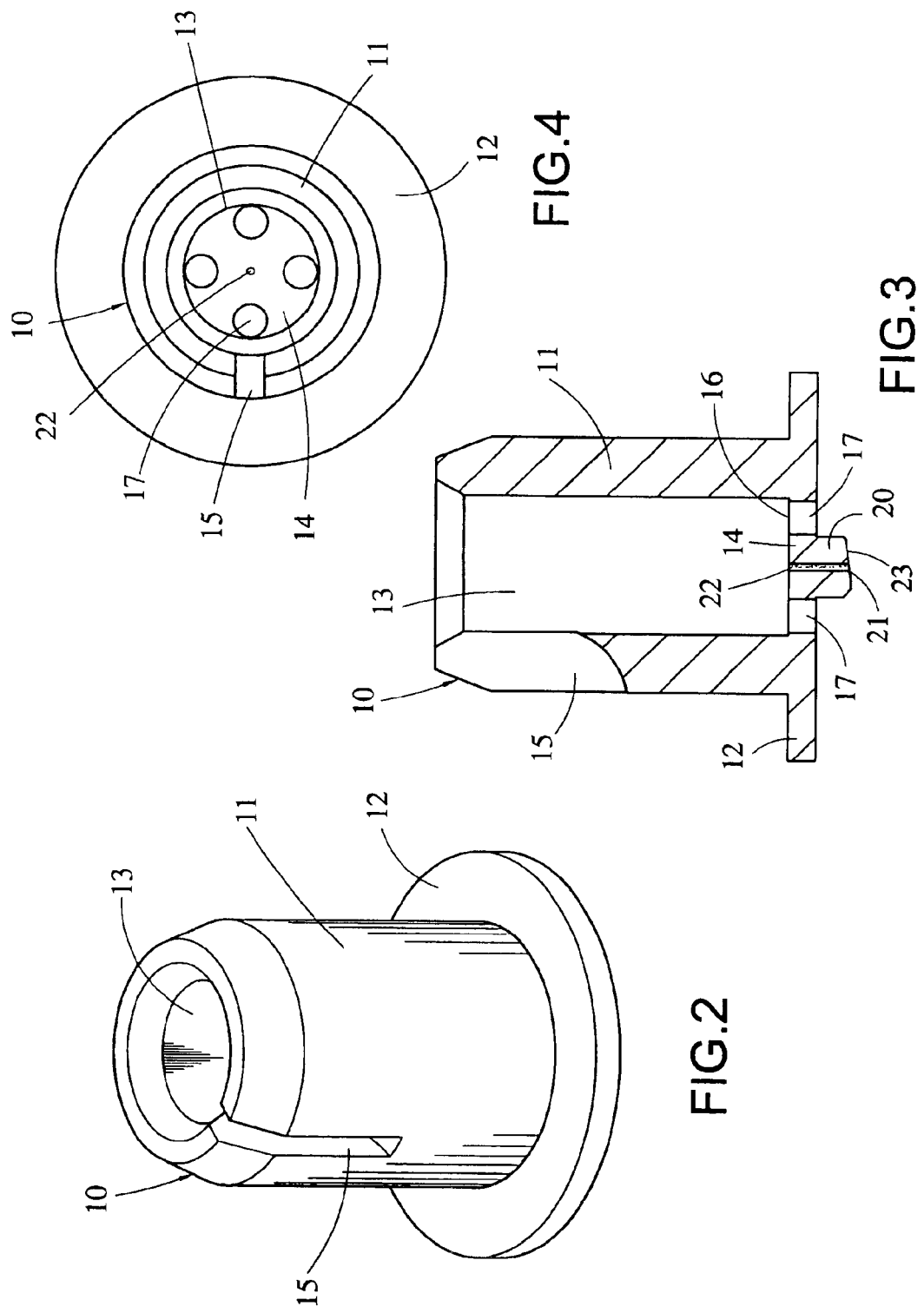

OPTICAL CONNECTOR

BACKGROUND OF THE INVENTION

1. Field of the Invention

The present invention relates to optical connectors and more particularly to such an optical connector with improved characteristics including higher coupling efficiency.

2. Description of Related Art

Conventionally, laser diodes are used as a light source element or detection elements are used as a light reception element in the current optical communication system. The laser diodes are encapsulated to form a laser diode element and the detection elements are encapsulated to form a light detection element respectively. Either laser diode element or light detection element can be coupled to the bottom of an optical connector to form either a light emitting module or a light reception module by laser welding. The section of a conventional optical connector is shown in FIG. 1. The connector comprises a hollow, cylindrical shroud 1, a sleeve 2 coaxially fitted in the shroud 1, a cylinder 3 coaxially fitted in a lower part of the sleeve 2 so as to form a first space 4 for mounting an optical fiber connector therein and a second space 5 between the shroud 1 and the cylinder 3, and a ring 6 fitted in the second space 5 by means of rivets, resulting in a fastening of the shroud 1 and the cylinder 3. Also, a bottom of the cylinder 3 is shaved to form a slope 7 which is adapted to prevent reflected light from directly impinging on a laser diode element. Otherwise, the laser diode element may be interfered by noise.

An optical fiber 8 is coaxially fitted in the cylinder 3 so that light emitted from the laser diode element is focused on the core of the optical fiber 8. The focused light is then directed to the optical fiber of the optical fiber connector 8.

However, the prior art suffered from several disadvantages. For example, for increasing coupling efficiency of the optical connector light emitted from the laser diode has to travel a relatively long distance prior to reaching the optical fiber 8 for focusing on the core thereof. As such, the cylinder 3 will adversely increase space between the laser diode and the optical fiber and increase the loss of optical energy. Further, it may cause inconvenience in operation. Furthermore, the manufacturing cost is relatively high because both the sleeve 2 and the cylinder 3 are made of ceramic materials. Moreover, the sleeve 2 tends to slip while plugging or unplugging the optical connector. In addition, allowances of many constituent components may accumulate, resulting in a degradation of electrical characteristics. Hence, a need for improvement exists.

SUMMARY OF THE INVENTION

It is an object of the present invention to provide an optical connector comprising a hollow, cylindrical shroud comprising a cylindrical section, a bore defined within the cylindrical section, the bore having a diameter to allow an optical fiber connector to fit therein and allow the same to plug or unplug a predetermined number of times, the bore being terminated at an opening in the bottom of the cylindrical section; a cylinder axially extended a predetermined distance from a center of the bottom of the cylindrical section, the cylinder comprising a longitudinal hole with an optical fiber fitted therein wherein a precise circularity in each of the bore and the longitudinal hole and coaxial characteristics of the same are obtained by forming the shroud and the cylinder by electrical casting, and a longitudinal axis of the bore is coaxial with a core of the optical fiber; and an annular flange formed integrally in a bottom of the shroud by electrical casting or injection molding, the flange being adapted to fasten either a laser diode element or a light detection element. By utilizing the present invention, a number of advantages such as significant reduction in the length of the optical connector, increase of coupling efficiency, a precise circularity in each of the cylinder, the flange, and the shroud, a precise coaxial characteristic of the optical connector, alignment of the light emitting position of the laser diode element with the optical fiber, and increase of performance can be obtained.

It is another object of the present invention to provide an optical connector comprising a hollow, cylindrical shroud comprising a cylindrical first section, a cylindrical second section at a bottom of the first section, the second section comprising a bottom and an annular shoulder, and a bore defined within the first section, the bore having a diameter to allow an optical fiber connector to fit therein and allow the same to plug or unplug a predetermined number of times, the bore being terminated at an opening in the bottom of the first section; a cylinder axially extended a predetermined distance from a center of the bottom of the second section, the cylinder comprising a longitudinal hole with an optical fiber fitted therein wherein a precise circularity in each of the bore and the longitudinal hole and coaxial characteristics of the same are obtained by forming the shroud and the cylinder by injection molding, and a longitudinal axis of the bore is coaxial with a core of the optical fiber; and an annular flange assembly formed integrally in a bottom of the shroud by injection molding or riveting, the flange assembly comprising an interior cavity with the shoulder coupled to a top of the cavity by injection molding or riveting, thereby securing the flange assembly to a laser diode element or a light detection element.

In one aspect of the present invention a longitudinal slit is formed on a surface of the shroud, the slit being adapted to provide a sufficient flexibility of the optical connector for withstanding the predetermined times of plugging or unplugging.

In another aspect of the present invention a slope is formed by shaving the bottom of the cylinder. The slope is adapted to prevent reflected light from directly impinging on the laser diode element. Otherwise, the laser diode element may be interfered by noise.

The above and other objects, features and advantages of the present invention will become apparent from the following detailed description taken with the accompanying drawings.

BRIEF DESCRIPTION OF THE DRAWINGS

FIGS. 2, 3, and 4 are perspective, cross-sectional, and top plan views of a first preferred embodiment of optical connector according to the invention respectively;

DETAILED DESCRIPTION OF THE PREFERRED EMBODIMENTS

Figure 1:
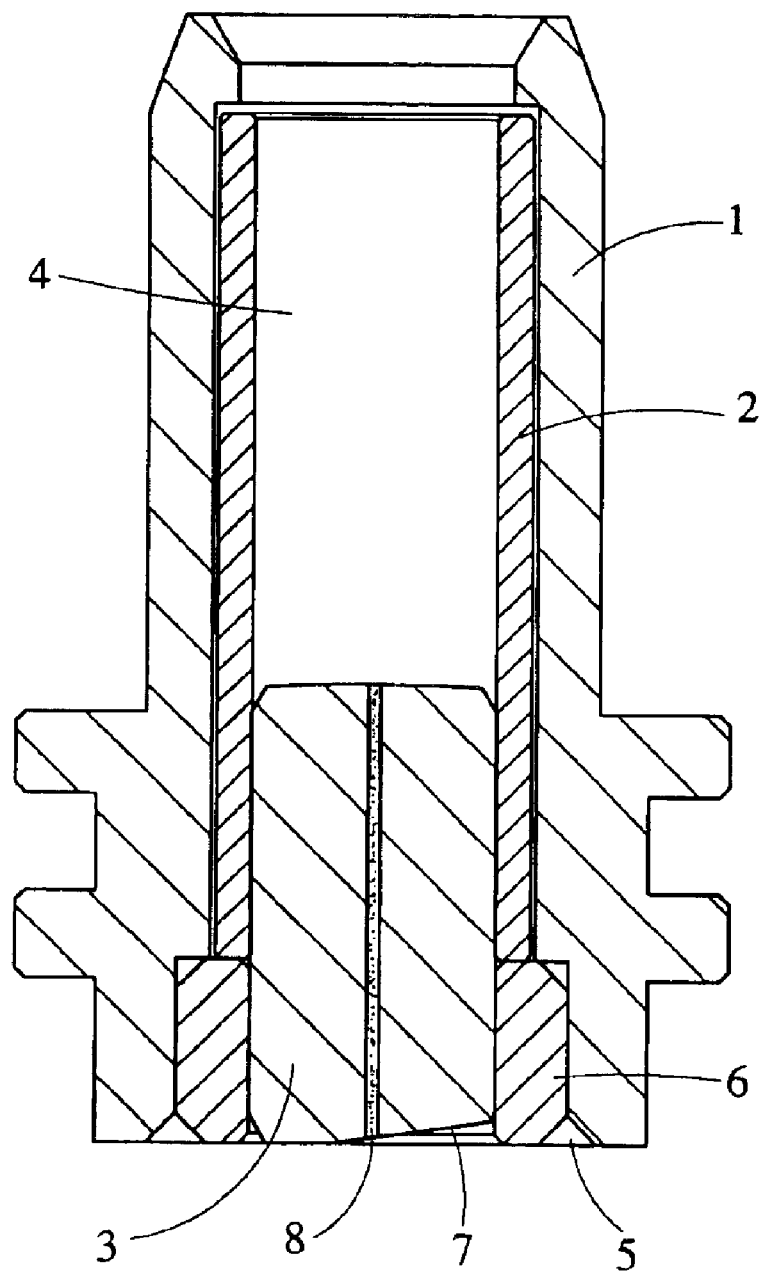
FIG. 1 is a cross-sectional view of a conventional optical connector.

Referring to FIGS. 2, 3 and 4, there is shown an optical connector constructed in accordance with a first preferred embodiment of the invention. The optical connector comprises a hollow, cylindrical shroud 10 and a cylinder 20 inside the shroud 10. The shroud 10 and the cylinder 20 are formed by electrical casting for obtaining a precise circularity in both inner and outer diameters of the optical connector and a precise coaxial characteristic of the optical connector as required. Each component of the shroud 10 and the cylinder 20 will be described in detail below.

The shroud 10 comprises a cylindrical section 11 and an annular flange 12 in the bottom of the section 11. A bore 13 is defined within the section 11. The bore 13 has a diameter to allow an optical fiber connector to fit therein and allow the same to plug or unplug for a maximum number of times. The bore 13 is terminated at an opening 16 in a bottom 14. A longitudinal slit 15 is formed on a surface of the section 11. The slit 15 is adapted to provide a sufficient flexibility of the optical connector even after many times of plugging or unplugging of the optical fiber connector into or from the bore 13. The flange 12 is adapted to fasten a laser diode element or a light detection element. The cylinder 20 is axially extended a predetermined distance from the center of the bottom 14. The cylinder 20 comprises a longitudinal hole 21 with an optical fiber 22 fitted therein. As stated above, a precise circularity in each of the bore 13 and the hole 21 and coaxial characteristics of the same can be obtained since the shroud 10 and the cylinder 20 are formed by electrical casting. Moreover, it is possible of ensuring that the longitudinal axis of the bore 13 is coaxial with the core of the optical fiber 22.

Four channels 17 are formed in the bottom 14. The channels 17 are equally spaced around the cylinder 20. The channels 17 are adapted to communicate air and/or fluid therethrough for facilitating the optical fiber connector to plug or unplug into or from the bore 13. Moreover, supersonic cleaning fluid is discharged from the channels 17 after cleaning the optical connector from the top of the cylinder 20. Also, a bottom of the cylinder 20 is shaved to form a slope 23 which is adapted to prevent reflected light from directly impinging on a laser diode element. Otherwise, the laser diode element may be interfered by noise.

Figure 7:
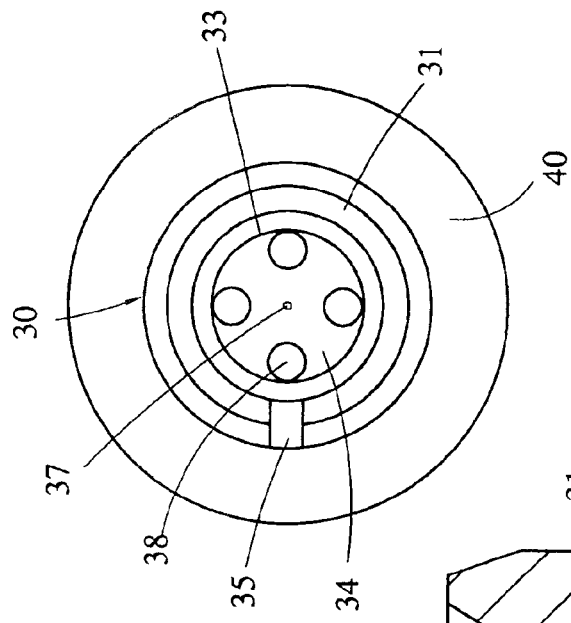
FIGS. 5, 6, and 7 are perspective, cross-sectional, and top plan views of a second preferred embodiment of optical connector according to the invention respectively.
Figure 6:
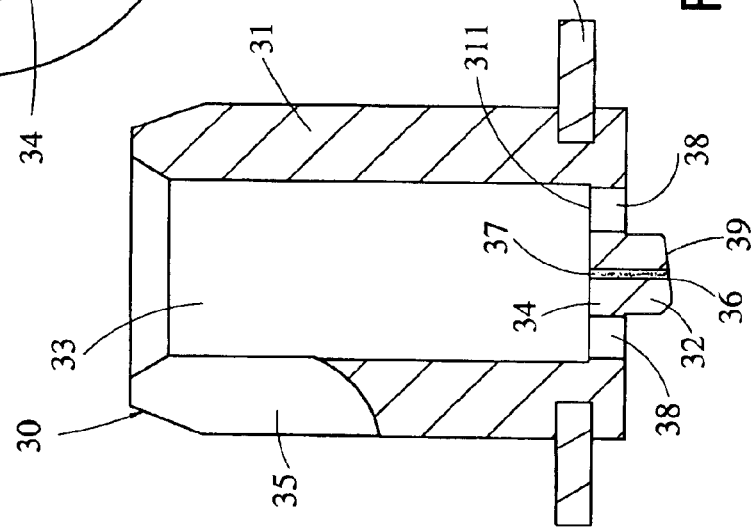
Figure 5:
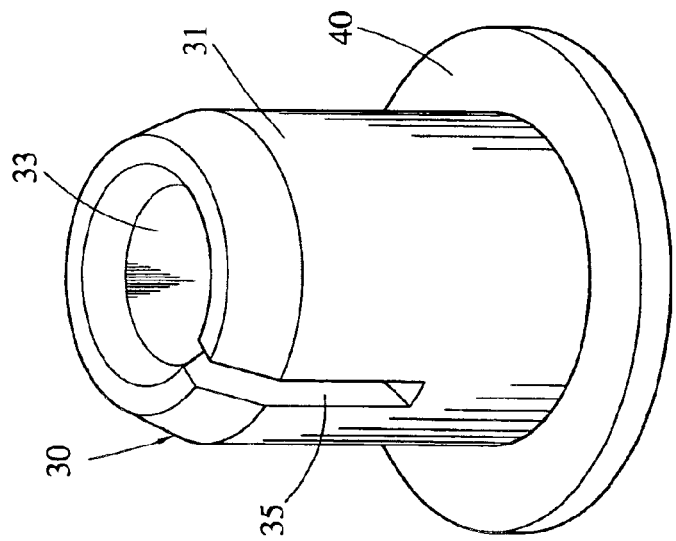

Referring to FIGS. 5, 6 and 7, there is shown an optical connector constructed in accordance with a second preferred embodiment of the invention. The optical connector comprises a hollow, cylindrical shroud 30 and an annular flange 40 in the bottom of the shroud 30. The flange 40 is adapted to fasten a laser diode element or a light detection element. The shroud 30 and the metal flange 40 are formed integrally by injection molding. Each component of the shroud 30 will be described in detail below.

The shroud 30 comprises a cylindrical section 31 and a cylinder 32. A bore 33 is defined within the section 31. The bore 33 has a diameter to allow an optical fiber connector to fit therein and allow the same to plug or unplug for a maximum number of times. The bore 33 is terminated at an opening 311 in a bottom 34. A longitudinal slit 35 is formed on a surface of the shroud 30. The slit 35 is adapted to provide a sufficient flexibility of the optical connector even after many times of plugging or unplugging of the optical fiber connector into or from the bore 33. The cylinder 32 is axially extended a predetermined distance from the center of the bottom 34. The cylinder 32 comprises a longitudinal hole 36 with an optical fiber 37 fitted therein. As stated above, a precise circularity in each of the bore 33 and the hole 36 and coaxial characteristics of the same can be obtained since the shroud 30 and the cylinder 32 are formed by injection molding. Moreover, it is possible of ensuring that the longitudinal axis of the bore 33 is coaxial with the core of the optical fiber 37.

Four channels 38 are formed in the bottom 34. The channels 38 are equally spaced around the cylinder 32. The channels 38 are adapted to communicate air therethrough for facilitating the optical fiber connector to plug or unplug into or from the bore 33. Moreover, supersonic cleaning fluid is discharged from the channels 38 after cleaning the optical connector from the top of the cylinder 32. Also, a bottom of the cylinder 32 is shaved to form a slope 39 which is adapted to prevent reflected light from directly impinging on a laser diode element. Otherwise, the laser diode element may be interfered by noise.

Figure 10:
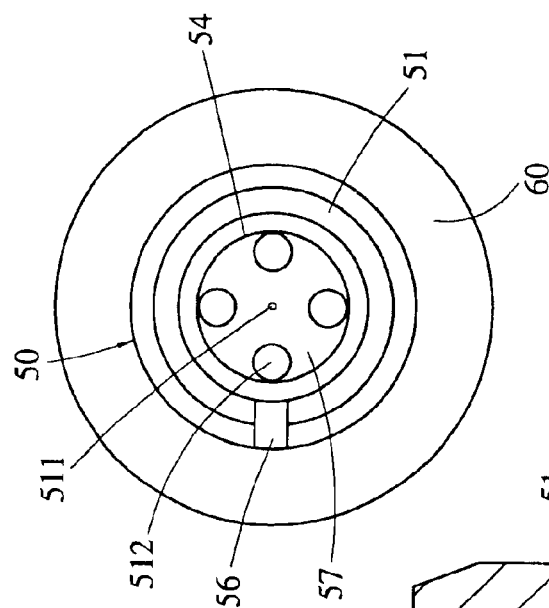
FIGS. 8, 9, and 10 are perspective, cross-sectional, and top plan views of a third preferred embodiment of optical connector according to the invention respectively.
Figure 9:
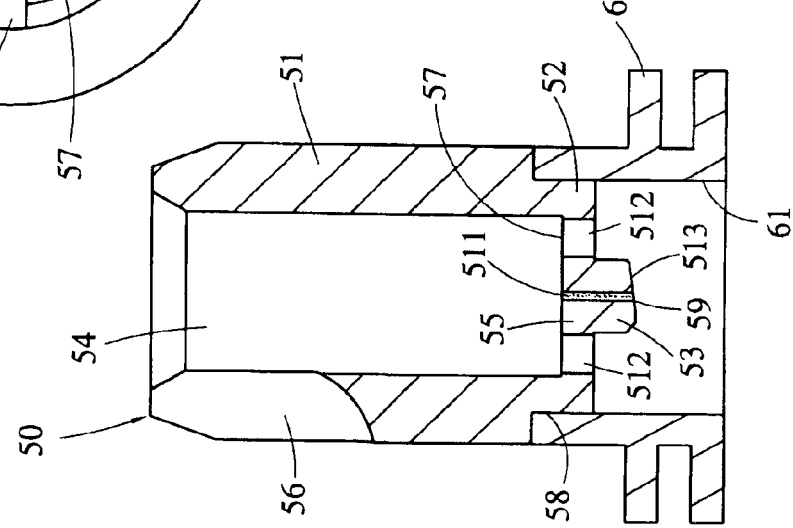
Figure 8:
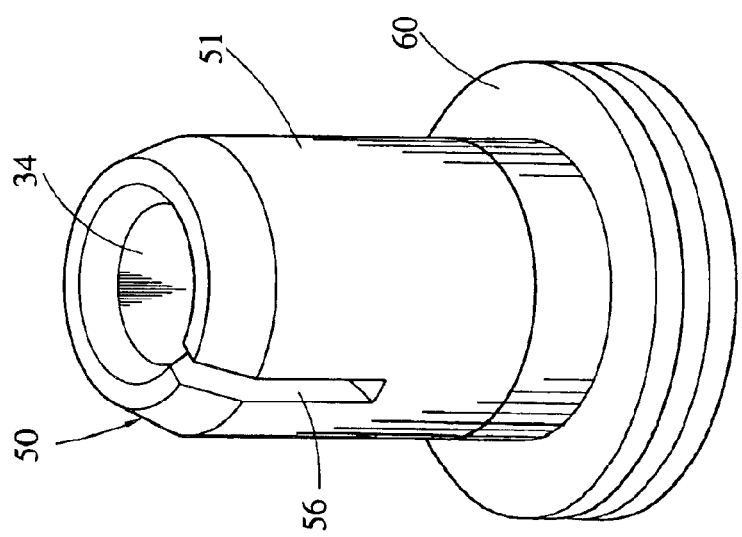

Referring to FIGS. 8, 9 and 10, there is shown an optical connector constructed in accordance with a third preferred embodiment of the invention. The optical connector comprises a hollow, cylindrical shroud 50 and two annular upper and lower flanges 60 in the bottom of the shroud 50. The shroud 50 and metal the flanges 60 are formed integrally by either injection molding or riveting. Each component of the shroud 50 will be described in detail below.

The shroud 50 comprises a cylindrical first section 51, a cylindrical second section 52 at the bottom of the first section 51, and a cylinder 53. A bore 54 is defined within the first section 51. The bore 54 has a diameter to allow an optical fiber connector to fit therein and allow the same to plug or unplug for a maximum number of times. A longitudinal slit 56 is formed on a surface of the shroud 50. The slit 56 is adapted to provide a sufficient flexibility of the optical connector even after many times of plugging or unplugging of the optical fiber connector into or from the bore 54. The second section 52 comprises a bottom 55 and an annular shoulder 58. The bore 54 is terminated at an opening 57 in a bottom 55. The cylinder 53 is axially extended a predetermined distance from the center of the bottom 55. The cylinder 53 comprises a longitudinal hole 59 with an optical fiber 511 fitted therein. As stated above, a precise circularity in each of the bore 54 and the hole 59 and coaxial characteristics of the same can be obtained since the shroud 50 and the cylinder 53 are formed by injection molding. Moreover, it is possible of ensuring that the longitudinal axis of the bore 54 is coaxial with the core of the optical fiber 511.

Four channels 512 are formed in the bottom 55. The channels 512 are equally spaced around the cylinder 53. The channels 512 are adapted to communicate air therethrough for facilitating the optical fiber connector to plug or unplug into or from the bore 54. Moreover, supersonic cleaning fluid is discharged from the channels 512 after cleaning the optical connector from the top of the cylinder 53. Also, a bottom of the cylinder 53 is shaved to form a slope 513 which is adapted to prevent reflected light from directly impinging on a laser diode element. Otherwise, the laser diode element may be interfered by noise. A cavity 61 is formed inside the flanges 60. The shoulder 58 is coupled to top of the cavity 61 by injection molding or riveting. As such, the flanges 60 can be secured to a laser diode element or a light detection element.

It will be evident from the foregoing that the invention has advantages such as low cost, significant reduction in the size of optical coupling, increase of coupling efficiency between the light source and the optical fiber, increase of the coupling efficiency between the optical fiber and the light detection element, increase of component precision, and increase of performance.

While the invention herein disclosed has been described by means of specific embodiments, numerous modifications and variations could be made thereto by those skilled in the art without departing from the scope and spirit of the invention set forth in the claims.

What is claimed is:

1. An optical connector, comprising:
   a hollow, cylindrical shroud comprising a cylindrical section, a bore defined within the cylindrical section, the bore having a diameter to allow an optical fiber connector to fit therein and allow the same to plug or unplug a predetermined number of times, the bore being terminated at an opening in the bottom of the cylindrical section;
   a cylinder axially extended a predetermined distance from a center of the bottom of the cylindrical section, the cylinder comprising a longitudinal hole with an optical fiber fitted therein wherein a precise circularity in each of the bore and the longitudinal hole and coaxial characteristics of the same are obtained by forming the shroud and the cylinder by electrical casting, and a longitudinal axis of the bore is coaxial with a core of the optical fiber;
   an annular flange formed integrally in a bottom of the shroud by electrical casting or injection molding, the flange being adapted to fasten either a laser diode element or a light detection element; and
   a plurality of channels in the bottom of the shroud, the channels being equally spaced around the cylinder.

2. An optical connector, comprising:
   a hollow, cylindrical shroud comprising a cylindrical section, a bore defined within the cylindrical section, the bore having a diameter to allow an optical fiber connector to fit therein and allow the same to plug or unplug a predetermined number of times, the bore being terminated at an opening in the bottom of the cylindrical section;
   a cylinder axially extended a predetermined distance from a center of the bottom of the cylindrical section, the cylinder comprising a longitudinal hole with an optical fiber fitted therein wherein a precise circularity in each of the bore and the longitudinal hole and coaxial characteristics of the same are obtained by forming the shroud and the cylinder by electrical casting, and a longitudinal axis of the bore is coaxial with a core of the optical fiber;
   an annular flange formed integrally in a bottom of the shroud by electrical casting or injection molding, the flanges being adapted to fasten either a laser diode element or a light detection element; and
   a slope formed by shaving the bottom of the cylinder.

3. An optical connector, comprising:
   a hollow, cylindrical shroud comprising a cylindrical first section, a cylindrical second section at a bottom of the first section, the second section comprising a bottom and an annular shoulder, and a bore defined within the first section, the bore having a diameter to allow an optical fiber connector to fit therein and allow the same to plug or unplug a predetermined number of times, the bore being terminated at an opening in the bottom of the first section;
   a cylinder axially extended a predetermined distance from a center of the bottom of the second section, the cylinder comprising a longitudinal hole with an optical fiber fitted therein wherein a precise circularity in each of the bore and the longitudinal hole and coaxial characteristics of the same are obtained by forming the shroud and the cylinder by injection molding, and a longitudinal axis of the bore is coaxial with a core of the optical fiber;
   an annular flange assembly formed integrally in a bottom of the shroud by injection molding or riveting, the flange assembly comprising an interior cavity with the shoulder coupled to a top of the cavity by injection molding or riveting, thereby securing the flange assembly to a laser diode element or a light detection element;
   a plurality of channels in the bottom of the second section, the channels being equally spaced around the cylinder.

4. An optical connector, comprising:
   a hollow, cylindrical shroud comprising a cylindrical first section, a cylindrical second section at a bottom of the first section, the second section comprising a bottom and an annular shoulder, and a bore defined within the first section, the bore having a diameter to allow an optical fiber connector to fit therein and allow the same to plug or unplug a predetermined number of times, the bore being terminated at an opening in the bottom of the first section;
   a cylinder axially extended a predetermined distance from a center of the bottom of the second section, the cylinder comprising a longitudinal hole with an optical fiber fitted therein wherein a precise circularity in each of the bore and the longitudinal hole and coaxial characteristics of the same are obtained by forming the shroud and the cylinder by injection molding, and a longitudinal axis of the bore is coaxial with a core of the optical fiber;
   an annular flange assembly formed integrally in a bottom of the shroud by injection molding or riveting, the flange assembly comprising an interior cavity with the shoulder coupled to a top of the cavity by injection molding or riveting, thereby securing the flange assembly to a laser diode element or a light detection element; and
   a slope formed by shaving the bottom of the cylinder.

* * * * *